Feb. 20, 1934.  S. H. EDWARDS  1,948,028
PRESSURE STILL HEADER AND ASSEMBLING TOOL
Filed June 26, 1931  2 Sheets-Sheet 1
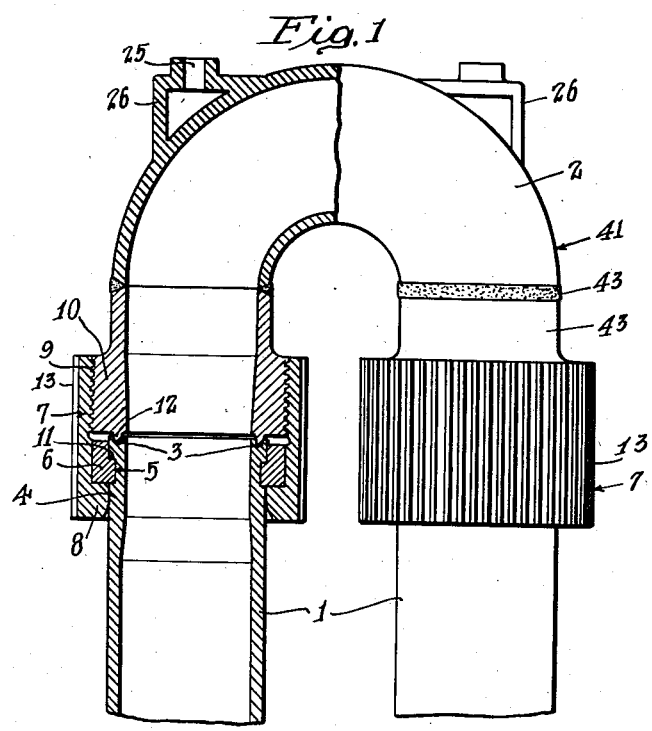
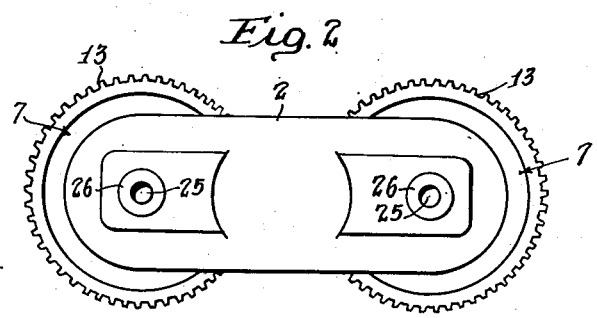
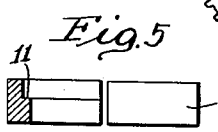
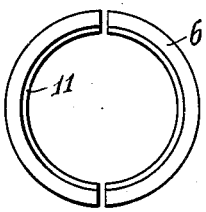
Inventor
Samuel H. Edwards
By Lyon & Lyon
Attorneys Feb. 20, 1934. S. H. EDWARDS 1,948,028
PRESSURE STILL HEADER AND ASSEMBLING TOOL
Filed June 26, 1931  2 Sheets-Sheet 2

Inventor
Samuel H. Edwards
By Lyon & Lyon
Attorneys

Patented Feb. 20, 1934

1,948,028

UNITED STATES PATENT OFFICE 1,948,028

PRESSURE STILL HEADER AND ASSEMBLING TOOL

Samuel H. Edwards, Richmond, Calif., assignor to Standard Oil Company of California, San Francisco, Calif., a corporation of Delaware Application June 26, 1931. Serial No. 547,006

6 Claims. (Cl. 81—57)

This invention relates to return bends, or headers, as they are commonly called, for mechanically joining and providing a fluid connection between the ends of two parallel tubes, or pipes. It is particularly adapted for use in water tube boilers, oil stills, and similar apparatus in which the tubes are numerous, are positioned close together, and must withstand high working pressures and temperatures.

An object of the invention is to provide a header construction of desirable mechanical and hydraulic characteristics, that is, a header that is light, strong, heat resistant, and that has a smooth internal bore at least as large as the bore of the tubing it connects.

Another object is to provide a header that can be readily attached and removed even when used on tubes that are crowded very close together.

Another object is to provide a header that can be readily and cheaply manufactured.

Still another object is to provide a wrench that can be used to install, or remove, headers constructed in accordance with my invention, particularly when used on closely spaced tubes, that can be operated either by manual or machine power and that is capable of exerting an extremely powerful torque.

Present headers and return bends are of many types, but those most generally used consist either of a heavy cast steel body swaged to the tubes to be joined, or of flanged steel construction adapted to be attached by numerous bolts to flanges on the ends of the tubes. The first type is heavy and is only adapted to be made by casting, which, with the alloy steels required to prevent corrosion, is expensive to make, as the greater proportion of the castings poured is defective and must be rejected. Furthermore, the hydraulic characteristics of headers of this type are usually poor, and they may cause a large pressure drop. In case of injury to one tube, both tubes must usually be cut or burned out of the header and both tubes are usually destroyed during the removing process. The flange type is unsatisfactory chiefly because it is very bulky, which prevents the close nesting of the tubes.

A simple expedient to eliminate the unsatisfactory features of the headers described would seem to be to provide a steel return bend adapted to be united to the ends of the tubes by some sort of screw connection. Heretofore, a serious impediment to the development of such a header has been the lack of a suitable method of applying sufficient force to the screw holding means to make the compression joint between the tubing and the header tight under the high pressures and temperatures under which they may be used. In accordance with the present invention, this difficulty has been overcome by uniting the header to the tubing with an elongated internally threaded nut provided with gear teeth around its outer circumference, and then devising a wrench comprising a plurality of gears adapted to fit about and engage with the teeth on the nut whereby turning torque is applied to the nut at a plurality of points about its circumference. By a suitable gear reduction, the wrench multiplies the power applied to the nut so that an effective torque can be obtained of sufficient magnitude to produce a leak proof joint.

It will be apparent that this type of connection is not limited in its application to return bends alone, but can also be used with elbows and other types of joints of that nature, where a fitting is to be attached to a tube.

Referring to the drawings:

Fig. 1 is a view partly in cross section showing a pair of tubes united by a header in accordance with my invention.

Fig. 2 is an end view of the header shown in Fig. 1.

Figs. 5 and 6 are sectional and end views, respectively, of an element of the header construction shown in Fig. 1.

Figure 4:
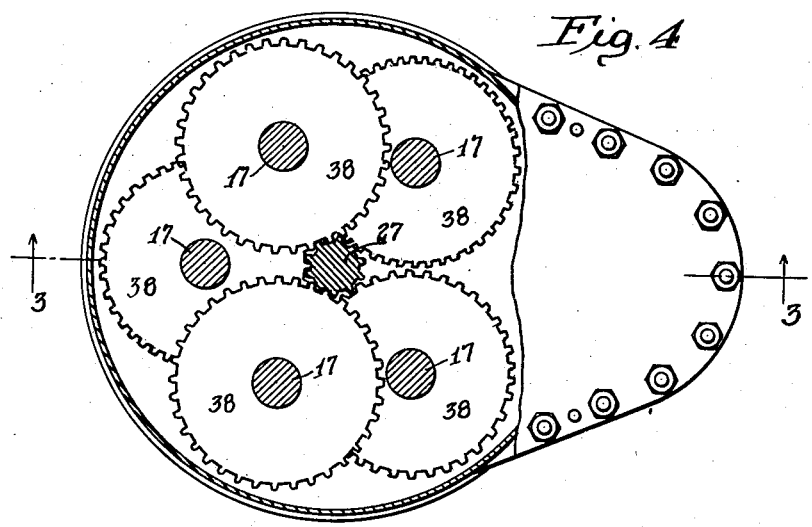
Fig. 4 is an end view of the wrench partly in section.

Referring to Fig. 1, two adjacent parallel tubes 1 are shown connected by a header 2. The open ends of header 2 are juxtaposed to the ends of tubes 1, and may be sealed thereto by means of a gasket 3. The end of the header may be formed into a tongue 12, and the end of pipe 1 may be grooved to receive the tongue as shown, but this construction is optional and flat surfaces may be substituted. Various well-known forms of contact faces requiring no gasket may also be used. The tubes 1, which may be of alloy steel, are upset, or thickened internally adjacent their ends as shown at 4, and are provided with an outer circumferential groove, or recess, 5 in which are fitted internally flanged steel retaining rings 6. The rings 6 are split into two halves as shown in Figs. 5 and 6, so that they may be readily inserted in the grooves 5. Surrounding both tube 1 and split retaining ring 6, is an elongated cylindrical steel nut 7 which has an inwardly projecting flange 8 at one end forming a shoulder resting against the retaining ring 6. The upper internal portion of nut 7 is provided with screw threads 9 which cooperate with similar threads on the outer circumference of the end portion 10 of header 2. The threads used to unite these parts may be of any desired type, but I have found the Acme form particularly suitable in this construction. The inner diameter of the portion of nut 7 immediately above the shoulder 8 is such as to fit snugly about the retaining ring 6 and prevent the shoulder 11 of the ring escaping from the groove 5 on the pipe 1. The header 2, nut 7, split ring 6, and tube 1 preferably should be constructed of similar metal in order that their coefficient of expansion under temperature changes shall be the same. I have found a material known in the trade as KA2S chromium nickel iron alloy to be satisfactory for oil-still use. The header 2 may be forged in one piece or may be made from a return bend portion 41 of alloy steel electrically or autogenously welded as at 42 to a forged steel tubular section 43. Shoulders 26 having a bearing hole 25 are formed on the upper part of the header 2. Their use will be explained later.

In assembling the header, the nut 7 is first slipped over the end of pipe 1, then the two halves of the retaining ring 6 are inserted in the groove 5 and the nut 7 withdrawn toward the end of the tube as far as it will go, to hold the retaining rings in position. The header 2 is then brought into position and the nut 7 threaded onto the shoulder 10 of the header. By tightening the nut 7, the end 12 of the header is brought firmly against the end of pipe 1 so that the joint is sealed against leakage. The efficiency of a joint of this type depends, among other things, upon the force with which the two parts are held together. The force obtainable is usually limited by the torque which can be applied to the nut 7. To make possible the application of sufficient torque to nut 7 to produce a tight joint, the outer circumference of nut 7 is made cylindrical in shape and is provided with gear teeth 13 (as shown to the best advantage in Fig. 2) to mesh with gears in a special wrench designed for use therewith.

Figure 3:
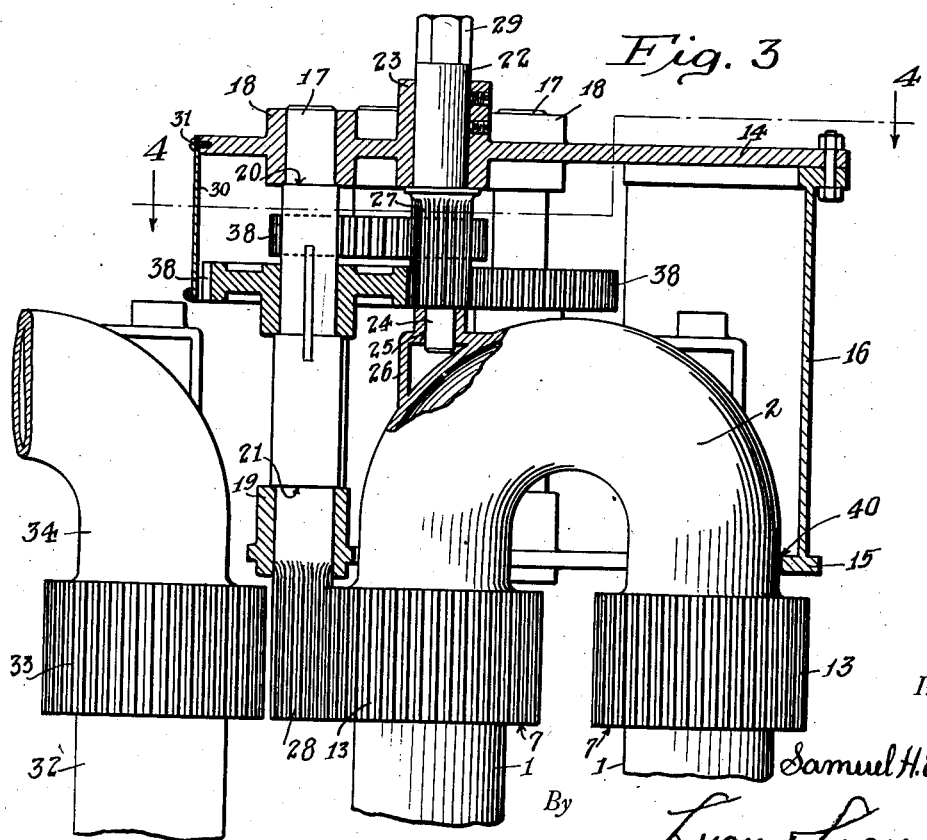
Fig. 3 is a view showing the wrench applied to a header.

As shown in Fig. 3, this wrench consists of a frame comprising an upper plate 14 and a lower plate 15 united by a U-shaped joining wall 16. The lower plate 15 has a portion cut out forming an aperture 40, to permit it to slip over the end of the header 2 and fit snugly thereabout. Rotatably mounted between the plates 14 and 15 and equidistant from a central point, are a plurality of shafts 17. These shafts extend through bushings 18 in the upper plate 14 and through bushings 19 in the lower plate 15.

Shoulders 20 and 21 on the shafts bear against the ends of bushings 18 and 19 to prevent longitudinal motion of the shafts. Each shaft 17 has a pinion 28 with teeth formed therein adapted to mesh with the teeth on the nut 7 and the shafts 17 are positioned about nut 7 so that the teeth on each pinion 28 will mesh with the teeth 13. A driving shaft 22 is rotatably supported in a bushing 23 in the top plate 14, and, in use, is supported at its lower end by an extension 24 adapted to fit into bearing hole 25 in shoulder 26 on header 2. Mounted on shaft 22 between bushing 23 and the extension 24 is an elongated pinion 27 which meshes with a plurality of gears 38, each of which is mounted on and rigidly attached to one of the shafts 17. To enable all the gears 38 to mesh with pinion 27, some of them are mounted different distances from the plate 14, so that they overlap, as shown clearly in Fig. 3.

Fig. 4 shows how all the gears 38 mesh with the central pinion 27. The frame of the wrench is so dimensioned that driving shaft 22 is co-axial with nut 7, and the bearing 25, on header 2, is concentrically positioned with respect to the extended axis of nut 7; therefore, it follows that when the wrench assembly is dropped over the end of the header so that shaft extension 24 fits into bearing 25, the pinions 28 fit about the nut 7 and mesh with the teeth 13 thereon. In the tightening operation, a wrench may be applied to the hexagonal end 29 of driving shaft 22 and the shaft rotated.

The rotary motion of shaft 22 is transmitted through pinion 27 and gears 38 to shafts 17, forcing them all to rotate in the same direction, which causes pinion 28 on each shaft 17 to apply an equal turning moment to the nut 7. Obviously, by the simultaneous application of force to the nut at a plurality of points around its circumference, far greater force can be exerted without injury thereto than if it were attempted to apply the total force at one point. In addition, the gear train provides a substantial multiplication of the force applied to shaft 22, since the pinion 27 on that shaft is of relatively small diameter compared with the diameter of gears 38 and the pinions 28 are of substantially smaller diameter than gears 38, and are usually smaller than the nut 7 with which they engage.

It will be noted that since there is an intermediate gear between shaft 22 and the nut 7, the direction of rotation of shaft 22 and of the nut 7 are the same, there being two reversals of direction; that is, clock-wise rotation of the shaft 22 produces counter-clockwise rotation of shafts 17 which in turn produce clockwise rotation of the nut 7.

To protect workmen from possible injury, a light sheet metal guard 30 may be provided. It is attached to the upper plate 14 by screws 31 as disclosed in Figure 3, and extends over the gears 38.

In utilizing the assembling wrench, a tube 1 is loosely attached to the header by giving the nut 7 a few turns by hand to hold the header roughly in position on the end of the tube. The wrench frame is then slipped over the header so that the centering pin 24 drops into the bearing hole 25 and the pinions 28 mesh with the teeth on the outer circumference of the nut 7. Shaft 22 is then turned either by applying a hand wrench to the hexagonal end 29 or by connecting, by any known mechanical means, a suitable source of rotary motion thereto. The rotation of shaft 22 rotates the gears 38 in the reverse direction and since the frame bearing the gears 38 is prevented from turning by the floor plate 15 which fits snugly about the header tube, the gears 38 and shafts 17 are forced to turn in bearings 18 and 19 and rotate the nut 7 by engagement between the teeth 13 on the nut and the teeth on pinions 28.

Obviously, to remove a header, the wrench is applied in the same manner and shaft 22 turned in the reverse direction. After the nuts 7 are loosened, the header is disassembled by sliding nut 7 back, thus permitting the removal of the split rings 6, after which the nut 7 may be withdrawn over the end of tube 1. The tube is thus left free and undamaged for cleaning, gaging, rotation, or removal.

A particular advantage of the wrench is that the pinions 28 which engage with the nut 7 may be made of relatively small diameter so that the wrench may be used on very closely spaced headers; thus in Fig. 3, the header 34 attached to an adjacent tube 32 is shown positioned just far enough away from the header 2 to permit clearance between the pinion 28 on shaft 17 and teeth on the nut 33 of header 34.

Although I have shown a wrench capable of tightening only one of the nuts on a header at a time, it is possible to modify its construction to permit the simultaneous application of torque to both the nuts on a header. Various modifications of the gear and pinion combinations could also be developed, without departing from the essential features of the invention.

It should be noted that since the nut 7 screws onto the header 2, no undue torque or twisting strain is applied to the tubes themselves; this is advantageous since such strains may tend to distort or injure the tubes either at the time of assembling the headers or while they are under the stresses caused by high pressures or temperatures.

I claim:

1. A wrench for turning a toothed union member on a pipe joint which is provided with a centering means, comprising a frame shaped to fit about said joint for preventing relative rotation therebetween and having a bearing member engaging with the centering means on said joint, a first gear rotatably supported in said frame and positioned to mesh with the teeth on said union member, a second gear attached to the first, a third gear rotatably supported in said frame and meshing with said second gear, and means for rotating said third gear.

2. A wrench for turning a toothed union member on a pipe joint which is provided with a centering projection having a concentric surface, comprising a frame shaped to fit about said joint for preventing relative rotation therebetween and having a bearing member fitting the concentric surface of the projection on the joint for centering said wrench with respect to said union member, a first gear shaft rotatably supported in said frame carrying a gear and positioned to mesh said gear with the teeth on said union member, a second gear fixed to said gear shaft and a third gear rotatably supported in said frame and meshing with said second gear and means for rotating said third gear.

3. An assembling tool for turning a toothed nut on a member of such configuration as to preclude the application of a socket wrench to the nut, said tool comprising a frame, a shaft supported in said frame, a pinion rigidly fixed on said shaft cut to mesh with the toothed nut, another gear fixed on said shaft larger than said pinion, a second shaft supported in said frame having a pinion meshing with the gear on said first shaft, and a projecting end on said second shaft for connection to a source of rotary motion, said frame being shaped to fit about said member and prevent relative rotation therebetween.

4. A wrench for turning a toothed nut, comprising a frame, a plurality of shafts supported in said frame and having pinions attached thereto, said pinions being positioned to fit about and mesh with the toothed nut, a second, larger gear fixed to each of said shafts, a driving shaft supported in said frame centrally with respect to said first shafts and a pinion on said driving shaft meshing with said larger gears on said first shafts.

5. A tool for turning a threaded nut on a return bend fitting, comprising a frame for enclosing the U of said bend and rotatable actuating means adapted to engage said nut at a plurality of points to turn it in either direction, said frame mounting said rotatable means tangential to an arm of said fitting and in contact with said nut.

6. A tool for turning a threaded nut on a return bend fitting comprising a frame for enclosing the U of said bend and rotatable actuating means adapted to engage said nut to turn it in either direction, said frame mounting said rotatable means tangential to an arm of said fitting and in contact with said nut.

SAMUEL H. EDWARDS.